US011727580B2

(12) United States Patent
Ehala et al.

(10) Patent No.: US 11,727,580 B2
(45) Date of Patent: Aug. 15, 2023

(54) METHOD AND SYSTEM FOR GATHERING INFORMATION OF AN OBJECT MOVING IN AN AREA OF INTEREST

(71) Applicant: Fyma OÜ, Tallinn (EE)

(72) Inventors: Kristin Ehala, Tallinn (EE); Taavi Tammiste, Tallinn (EE); Kaarel Kivistik, Tallinn (EE)

(73) Assignee: Fyma OÜ, Tallinn (EE)

( * ) Notice: Subject to any disclaimer, the term of this patent is extended or adjusted under 35 U.S.C. 154(b) by 0 days.

(21) Appl. No.: 17/330,919

(22) Filed: May 26, 2021

(65) Prior Publication Data

US 2022/0366575 A1 Nov. 17, 2022

(30) Foreign Application Priority Data

May 14, 2021 (EP) ..................... 21173880

(51) Int. Cl.
*G06T 7/246* (2017.01)
*G06T 7/215* (2017.01)
(Continued)

(52) U.S. Cl.
CPC .............. *G06T 7/248* (2017.01); *G06T 7/215* (2017.01); *G06T 11/203* (2013.01); *H04N 7/0127* (2013.01); *H04N 7/183* (2013.01); *G06T 2200/24* (2013.01); *G06T 2207/10016* (2013.01); *G06T 2207/20081* (2013.01);
(Continued)

(58) Field of Classification Search
CPC . G06T 2207/30232; G06T 2207/30241; G06T 7/20; G06T 7/292; H04W 4/029; H04W 4/33; G06V 10/255; G06V 20/52; G06V 20/53; G06V 40/23
See application file for complete search history.

(56) References Cited

U.S. PATENT DOCUMENTS

2018/0255336 A1* 9/2018 Tallamy ........... H04N 21/23418
2018/0268556 A1* 9/2018 Karavadi ................ G06T 7/277
(Continued)

FOREIGN PATENT DOCUMENTS

WO WO-2020201969 A1 * 10/2020 ............. A61B 5/002

OTHER PUBLICATIONS

European Patent Office, Extended European Search Report, Application No. 21173880.2, dated Nov. 2, 2021, 7 pages.
(Continued)

*Primary Examiner* — Ming Wu
(74) *Attorney, Agent, or Firm* — Ziegler IP Law Group, LLC

(57) ABSTRACT

A method, system, and computer program for gathering information of an object moving in an area of interest by using AI-based video processing and analytics, object detection, and tracking moving objects from a video frame to frame. The system, method, and computer may be implemented as a platform including an analytics dashboard and a backend dashboard. The analytics dashboard enables via the UI to display to the user the camera feeds being monitored and analytics results from those feeds over a period of time. The backend dashboard allows the user to set up a camera feed themselves and post-process pre-captured video files using algorithms made available via the system that the user can pick and choose between.

14 Claims, 7 Drawing Sheets

(51) Int. Cl.
 *G06T 11/20* (2006.01)
 *H04N 7/01* (2006.01)
 *H04N 7/18* (2006.01)

(52) U.S. Cl.
 CPC ............... *G06T 2207/20084* (2013.01); *G06T 2207/30232* (2013.01); *G06T 2207/30241* (2013.01)

(56) References Cited

U.S. PATENT DOCUMENTS

2019/0156495 A1* 5/2019 Altuev ...................... G06T 7/20
2020/0293783 A1* 9/2020 Ramaswamy ... H04N 21/23418

OTHER PUBLICATIONS

Hidetomo, Sakaino, "Video-Based Tracking Learning, and Recognition Method for Multiple Moving Objects", IEEE Transaction on Circuits and Systems for Video Technology, vol. 23, No. 10, pp. 1661-1674, XP011528516, ISSN: 1051-8215, DOI: 10.1109/TCSVT.2013.2255400, Oct. 1, 2013, 14 pages.
Tseng et al, Real-Time Video Surveillance for Traffic Monitoring Using Virtual Line Analysis, 2002 IEEE International Conference on Multimedia and Expo: Aug. 26-29, 2002, vol. 2, p. 541, XP032964528, DOI: 10.1109, ICME.2002.1035671, ISBN: 978-0-7803-7304-4, Aug. 26, 2002, 4 pages .

* cited by examiner

METHOD AND SYSTEM FOR GATHERING INFORMATION OF AN OBJECT MOVING IN AN AREA OF INTEREST

TECHNICAL FIELD

The present disclosure generally relates to video processing and analytics, and more specifically, to a method and system for monitoring an area of interest and gathering information related to the objects moving in the area of interest.

BACKGROUND

Monitoring outdoor or indoor areas of interest (e.g., intersections, parking lots, shopping malls) for the detection, tracking, counting, and classification of moving objects require using a large set of physical sensors or specific hardware camera components, e.g., motion sensors, Internet-of-Things sensors, cameras. To cover the whole area of interest and understand in which directions, when what type, and how many objects (e.g., pedestrians on the streets, visitors in the shopping malls, vehicles in the parking lots and intersections) are moving in the area of interest, a complex and expensive infrastructure of sensors, cameras, wiring, and other components have to be built considering the surroundings and weather conditions. A typical example of monitoring the traffic in the intersection having multiple driving lines requires installing approximately 18 or more cameras or sensors. Such monitoring infrastructures require regular maintenance and replacement of components and have several other drawbacks.

Currently known radar-based IoT sensors don't have object classification capability, or object classification functionality is limited to large objects like vehicles. Such IoT sensors are expensive to set up and maintain and usually cover only a small specific area of interest, such as an entrance or exit of an area. The wider the area to be monitored, the more sensors need to be added.

Current CCTV, CCD, CMOS, and other cameras and image sensors don't have object detection, classification, and trajectory mapping functionalities built-in due to limited hardware capabilities (i.e., CPU and GPU resources). While some known cameras have object detection features built-in, these are extremely limited and expensive for large-scale deployments. Even though known camera-based systems may be easy to install and may provide more information than physical sensors such as object class and trajectory, the data that these camera-based sensors provide can be hard to interpret. Due to that, the hardware components age, the solutions require replacement of the expensive hardware components. The same system cannot be used after the cameras are switched out.

The known systems don't enable intent and behavior detection because the source information is incomplete, i.e., the used sensors or cameras don't cover the whole area of interest or don't have the necessary functionality to collect the information, which would allow conducting more detailed analysis regarding the movements of different types of objects. Moreover, a monitoring system specifically designed for one use case (e.g., for monitoring the intersection) is not suitable for some other use case (e.g., for monitoring the paths of people visiting the shopping mall).

Therefore, in light of the foregoing discussion, there exists a need to overcome the aforementioned drawbacks associated with gathering accurate information of objects moving in the area of interest.

SUMMARY

The aim of the present disclosure is to provide accurate information on detection, tracking, counting, and classification of objects moving in an area of interest. The aim of the disclosure is achieved by a computer implemented method, system, and computer program for gathering information of an object moving in an area of interest.

In one aspect, an embodiment of the present disclosure provides a computer implemented method for gathering information of an object moving in an area of interest, the method comprises receiving in a processor of a computing system a video feed of a view of the area of interest, wherein the video feed of the view of the area of interest comprises at least one object moving in the area of interest; separating the received video feed of the view of the area of interest into frames; detecting the at least one object moving in an area of interest in a predefined number of subsequent frames; calculating a trajectory of the at least one detected object; executing superimposing of one or more virtual sensors at one or more locations in the view of the area of interest; detecting coordinates of the one or more locations of the one or more virtual sensors in the view of the area of interest; tracking the trajectory of the at least one object from frame to frame for detecting the trajectory crossing the one or more virtual sensors; using the detected trajectory crossing the one or more virtual sensors as the gathered information.

In another aspect, an embodiment of the present disclosure provides a system for gathering information of an object moving in an area of interest, the system comprises a computing system comprising at least one processor and a memory, wherein the computing system is configured to receive a video feed of a view of the area of interest, the at least one processor is configured to separate the received video feed into frames, analyses the received video frame by frame to detect the at least one object in each frame, calculate a trajectory of the each detected object, receive the coordinates of one or more virtual sensors; and the memory is configured to store coordinates of the at least one object moving in an area of interest, coordinates of the one or more locations of the one or more virtual sensors, the detected trajectory crossing the one or more virtual sensors; and an application programming interface (API) configured to execute superimposing of one or more virtual sensors at one or more locations in the view of the area of interest; detect coordinates of the one or more locations of the one or more virtual sensors in the view of the area of interest; track the trajectory of the at least one object from frame to frame for detecting the trajectory crossing the one or more virtual sensors; use the detected trajectory crossing the one or more virtual sensors as the gathered information.

In a third aspect, an embodiment of the present disclosure provides a computer program for gathering information of an object moving in an area of interest comprising computer readable instructions adapted to perform the method according to the embodiments of the present disclosure, when the computer program is executed by the computing device.

Embodiments of the present disclosure enable to overcome the aforementioned problems in the prior art by using AI-based video processing and analytics, object detection, and tracking moving objects from a video frame to frame for gathering data related to the moving objects in the area of interest. The advantage of the present disclosure is that it enables to add more intelligence than existing solutions to video feeds of existing cameras, is more flexible as it can be used in various use-cases, does not need implementation of the physical sensor hardware at the location of interest.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary embodiments of the disclosure are now described, with references to the following drawings, wherein.

DETAILED DESCRIPTION OF EMBODIMENTS

Figure 1:
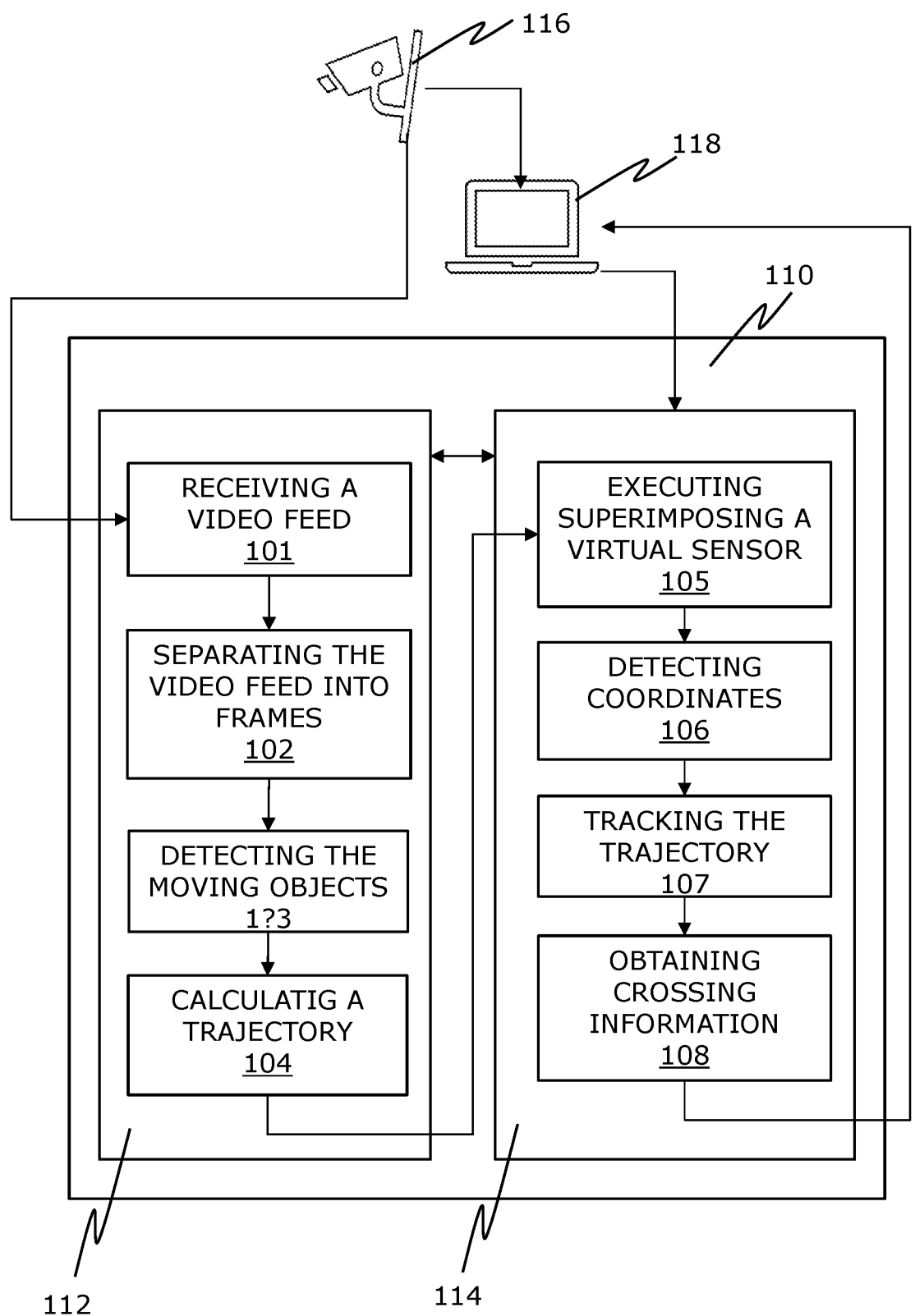
FIG. 1 is a block diagram of a method for gathering information of an object moving in an area of interest according to an embodiment of the present disclosure.

The following detailed description illustrates embodiments of the present disclosure and ways in which the embodiments can be implemented. In an aspect, the present disclosure provides a computer implemented method for gathering information of an object moving in an area of interest, the method comprises receiving in a processor of a computing system a video feed of a view of the area of interest, wherein the video feed of the view of the area of interest comprises at least one object moving in the area of interest; separating the received video feed of the view of the area of interest into frames; detecting the at least one object moving in an area of interest in a predefined number of subsequent frames; calculating a trajectory of the at least one detected object; executing superimposing of one or more virtual sensors at one or more locations in the view of the area of interest; detecting coordinates of the one or more locations of the one or more virtual sensors in the view of the area of interest; tracking the trajectory of the at least one object from frame to frame for detecting the trajectory crossing the one or more virtual sensors; using the detected trajectory crossing the one or more virtual sensors as the gathered information.

In an embodiment, a video feed (e.g., a live video stream or historically recorded video) of a view of the area of interest is tunneled from a video source (e.g., a camera recording the area of interest, a user device having a historically recorded video or other video sources) to the computing system, wherein the video feed is received in a processor.

The video source provides the video feed of a specific area of interest (e.g., shopping centers, hotels, airports, outdoor areas, intersections, crossroads, parking lots, streets) as an input to the system. The video feed is a result of transmitting a video signal from the video source to the server. The video stream is a video that is not recorded but broadcasted directly to the server. The video feed can be a live video stream or recorded historical video. The video source can be, e.g., a CCTV camera or other camera, which provides the video feed either directly or via the user device to the server.

The received video feed of the view of the area of interest is separated into frames for detecting the at least one object moving in an area of interest in a predefined number of subsequent frames. The moving object may be, for example, people (pedestrians, shopping mall clients, travelers in the airport, workers in the restaurant), vehicles (e.g., cars, bikes, busses, trucks), animals). The object moving in the recorded video of the area of the interest may move in view of the area of interest alone, or there may be two or more objects, who may move either separately or in one or more groups.

If two or more objects moving in the group, e.g., side by side very closely, the system is configured to determine trajectories of each of those objects, which is a significant advantage compared to the known object tracking system because the known systems do not enable to separate trajectories of closely moving objects and tracking trajectories of multiple objects as a trajectory of a single object. Thus, the present system enables to track of multiple objects moving densely in the monitored area. This is achieved by the trained detection neural networks by using the path point of the bounding boxes.

Detecting the at least one object moving in a predefined number of subsequent frames of an area of interest can be performed by using one or more machine learning models (e.g., trained detection neural networks that are configured to output bounding boxes around detected objects) or by using edge device (e.g., NVIDIA jetson).

Predefining the number of subsequent frames to be analyzed means determining the minimum number of consecutive frames, which is required to track an object. This means that the object must be identified in at least a certain number of frames to be considered a valid object. This is required to reduce the amount of data noise.

In the embodiments of the present disclosure, calculating the trajectory of the at least one detected object comprises determining a path point of the at least one detected object in each subsequent frame; detecting coordinates of the path point in each subsequent frame; connecting the coordinates of the path point in each subsequent frame. If the object tracked in the video feed crosses the virtual sensor, the processor is configured to detect the path point of the moving object that crosses the virtual sensor, detect the corresponding timestamp, moving direction of the object, and time period the object has been in the video feed. The detectable path point for the trajectory can be a lower or lower-middle part of the bounding box. Virtual sensor trigger is activated when object trajectory crosses the virtual sensor. This enables to obtain the information about the moving object and store the obtained information in the database.

The virtual sensor superimposed to the view of the area of interest can be one or more single straight lines or a combination of lines in different shapes. Executing the superimposing is achieved by providing the system to the user device a user interface (UI), which enables the user to superimpose the lines as virtual sensors to the video feed via UI and this way to provide to the system the user input. In addition to receiving in the system the locations of one or more virtual sensors via the UI, the executing the superimposing of the virtual sensors can be performed in alternative embodiments automatically by the processor of the system, which is configured to define a predetermined location in the camera view (e.g., sidewalk curb, exit or entrance area to the parking lot or to the shop, the first step of the stairs in the shopping mall) and adds the virtual sensor in the required shape to the predetermines location.

Throughout the present disclosure executing superimposing of one or more virtual sensors at one or more locations in the view of the area of interest, as used herein, refers to that the virtual sensor is not in the video but added by the user, e.g., as a separate layer on top of the video feed via the user interface, wherein the virtual sensor is associated with a specific location in the camera view, e.g., sidewalk curb, exit or entrance area to the shop in a shopping mall.

Optionally, the virtual sensor can be defined by receiving an input initiated by the user via the user interface displaying the video feed of the area on the screen of the user device (e.g., PC, laptop, tablet, smartphone). When the video feed of the area is displayed on the screen via the user interface, the user can mark on the screen at least two spots (i.e., a starting point and endpoint of the line) for forming the virtual sensor, the system detects the coordinates of the marked spots and forms a virtual sensor based on the detected coordinates of the starting point and endpoint of the line. Alternatively, the user can draw a line on the screen, the coordinates of the line are detected by the system and used as a virtual sensor.

Alternatively, the virtual sensor can be defined automatically by the system by detecting a place or a still object (i.e., an object which is not moving) in the video of the area, determining coordinates of the detected place or the still object and forming the line based on the determined coordinates.

Detecting coordinates of the one or more locations of the one or more virtual sensors in the view of the area of interest can be detected if the system is configured to determine the coordinates of the moving object on each frame and to combine the detected coordinates to the trajectory of the moving object.

Tracking the trajectory of the at least one object from frame to frame for detecting the trajectory crossing the virtual sensor can be determined if the system is configured, e.g., to track the coordinates of the moving object on each frame.

The virtual sensor is configured to deliver the following metadata: timestamp when the virtual sensor was crossed by the moving object, the class of the moving object that crossed the virtual sensor, the direction of crossing the virtual sensor. The detected trajectory crossing the one or more virtual sensors by the one or more virtual sensors is then used as the gathered information and displayed to the user in the user interface.

The embodiments of the present disclosure comprise proprietary software components and computer vision algorithms to extract additional information from one or more video feeds. I.e., in the embodiments according to the present disclosure, the system may receive more than one video feed from a single video source or multiple video sources. In the embodiments of receiving two or more video feeds, each video feed is processed by a corresponding processor to gather the information objects moving in the areas of interest.

The embodiments of the present disclosure enable to provide the user to define zones or lines on top of the video feed configured to start gathering information about movement and other metadata (e.g., moving direction, timestamp, crossing the virtual sensor, time how long the object has been in the frames, time how long the object has been hidden behind the other non-moving object) in the area of interest.

According to an embodiment, separating the received video feed into frames comprises changing a frame rate to 5 FPS-15 FPS. The frame rate frames per second (FPS) that the video is looked at can be from 5, 6, 7, 8, 9, 10, 11, 12, 13, 14 FPS to 6, 7, 8, 9, 10, 11, 12, 13, 14, 15 FPS. Preferably 9-10 FPS. This has an effect on the algorithm's ability to track objects as a lower FPS may not be suitable in tracking a vehicle. I.e., if the frame rate is less than 5FPS, the algorithm may not be able to detect the object in the frames and thus not able to calculate the trajectory.

According to an embodiment, detecting the at least one object moving in the view of the area of interest is performed by using one or more machine learning models trained to analyze one or more features of the detected at least one object and to analyze whether the at least one object is still visible in the predefined number of subsequent frames. The one or more features are specific shapes, lines, patterns in a frame representing a specific type of object as a person, a car, a bike, a bus, a truck, an animal.

The machine learning models can be trained on computer vision frameworks such as the You only look once (YOLO) framework or detection neural networks architecture. The system is configured to detect moving objects in the video feed, implement the bounding boxes to the detected objects and use the bounding boxes of the objects detected as triggers when the objects cross one or more of the defined virtual sensors. Each virtual sensor is configured to detect the lower middle part of the bounding box (e.g., a point of the moving object which touches the ground, e.g., a wheel of the vehicle, feet of the person) as the path point when crossing the virtual sensor (e.g., either the zone, line or ellipse).

The trained detection neural network architecture enables to configure the embodiments of the present disclosure according to specifics of the users' needs. The detection neural networks have fewer parameters and work faster and more accurately. The processing speed is increased due to having fewer parameters for the model to learn. In machine learning, parameters are the entities that the model learns by optimizing a loss function. The number of parameters is dependent on the size and number of layers that the model has. The machine learning models comprise a smaller number of neural network layers, therefore increasing detection speed. Accuracy is increased due to the model being trained from the first layer to last on the use case-specific dataset. This means that the features model learns are very specific to the specific use case needs.

The neural network models available in the prior art are pre-trained weight files trained on thousands of images and hundreds of classes, which are not specific enough to enable to be used in the embodiments of the present disclosure. The data models can be trained on the datasets acquired from users (e.g., the data can be either images from users' cameras or streams) that can be turned into separate frames or dataset collections provided by the public resources.

Optionally, all the frames may be anonymized and represent the real-life action and behavior that happens in the field of view of the camera.

In the process of training a detection neural network model, a dataset representing objects in the contexts necessary for the model to work (e.g., outdoor area, shopping malls, intersections, crossroads) is acquired and then annotated. The annotating means that each object is manually or semi-automatically marked on the image in a bounding box format. These annotations are stored in a database of model configuration files. The machine learning model (YOLO model, trained detection neural network model) is configured to annotate the images to train and find the most suitable weights and parameters for the model for specific use cases. This means that the model is configured to understand the importance of different features of the moving objects for the selected use case. The features are specific shapes, lines, patterns on an image that all together in a bundle represent a specific type of moving object like a person, a vehicle, an animal, etc. The model is trained to learn that the shapes and patterns together mean that an object is, e.g., a vehicle or something else.

For detecting on video, stream, or image, the embodiments of the present disclosure implement model configuration files and the learned weights and parameters of the model to carry out the detection.

According to an embodiment, wherein detecting the at least one object moving in the view of the area of interest is performed by a detection neural network configured to output bounding boxes around the at least one detected object in each frame of the predefined number of subsequent frames. Detecting is performed by the detection neural network that is configured to output bounding boxes around detected moving objects.

If two or more objects moving in the group, i.e., side by side very closely, the system is configured to determine trajectories of each of the objects in the group, which is a significant advantage compared to the known object tracking system because the known systems do not enable to separate trajectories of closely moving objects and tracking trajectories of multiple objects as a trajectory of a single object. Thus, the embodiments of the present method and system enable tracking multiple objects moving densely in the monitored area of interest. This is achieved by the trained detection neural networks or by using path points of the bounding boxes. The detection neural networks are configured to analyze the shape of the detected object and whether the object is still visible in the subsequent frames. This enables precise detection and tracking from frame to frame and thus to monitor multiple objects at the same time, objects moving closely or if some of the frames disappear.

In an example embodiment, a video feed of a view of an area of interest is received from the video resource in the computing system, wherein the video feed of the view of an area of interest comprises four people walking in a group. The computing system is configured to separate the received video feed of the view of the area of interest into a first frame and a second frame. When executing the superimposing virtual sensors, the user input of a first virtual sensor drawn in an ellipse shape having a first side and a second side in a first location and a second virtual sensor drawn in a line shape having a first side and a second side in a second location is received from the user device in the computing system. By executing a detection neural network by a processor of the computing device, the detection neural network outputs bounding boxes around each person in a group, detects the class of moving objects and determines a path points of each person in a group, i.e., a first path point, a second path point, a third path point, and a fourth path point. In a first instance, the computing system determines via the first virtual sensor the group of people entering the first location and the time the group of people spends in the first location in the area of interest. Frame by frame, the processor analyses the received video feed, when the group of people is moving to the second location, the computing system detects via the second, line-shaped virtual sensor the time moment when the group of people grosses the virtual sensor in the second location and calculates the trajectories of each person in the group.

According to an embodiment, executing the superimposing comprises providing a user interface via an application programming interface (API) of the computing system to the user device to receive a user input for generating the one or more virtual sensors.

The user interface enables the user to set the input parameters and define the locations of the virtual sensors and thus initiate the superimposing. The UI enables the users to define one or more parameters of the virtual sensor, e.g., the name of the video feed, the video stream URL, which includes the username, password, IP address and the port of the stream, the computer vision machine learning model to be used to detect objects in the stream, the frame rate, the minimum consecutive frames to track an object. These parameters help to determine the number of object classes to be detected, i.e., cars, busses, trucks, pedestrians.

Additionally, the user interface enables the system to provide to the user the gathered information of the objects moving in the area of interest. The gathered information may comprise, e.g., statistics from each virtual sensor, moving objects detected by class (e.g., vans, trucks, tractors, persons, motorbikes, cars, busses, bicycles, pedestrians) by date and time, the counted number of detected moving objects, the period (e.g., last 2 days, last week, last month). Further, the user interface enables the system to provide to the user the visualization and analysis of all detected, classified, monitored objects by classes; detected, classified, monitored objects by classes at the time moment of checking; location coordinates or address of the area of interest. The user interface may also be configured to enable the user to select the visualization format, provide bookmarking, saving, downloading, sharing, refreshing period, selection of which video feed to be displayed if multiple video sources are used, and other functionalities.

According to an embodiment, to initiate the information gathering and provide the input to the system, the user is instructed via the user interface to white label the camera IP addresses to the system, set up the cameras in the user interface, choose the machine learning model for detection, define the parameters (e.g., the frame rates and consecutive FPS for tracking, draw the shape of virtual sensors on the top of the video feed displayed via the user interface.

According to an embodiment, detecting the trajectory crossing the virtual sensor comprises comparing the coordinates of the trajectory of the at least one object moving in the view of the area of interest and the coordinates of the one or more locations of the one or more virtual sensors.

According to an embodiment, the method further comprises storing, for a pre-determined time, a last frame of the at least one object at a time moment when the at least one object was visible in the view of the area of interest last time. If the object disappears behind another object (i.e., the object which is not moving), the system is configured to store the last frame of the moving object for a predetermined time (e.g., for 3 seconds, based on the assumption of how long the moving object may be behind the non-moving object) to guarantee the continuous tracking of the object. This predetermined time is defined as a trajectory lifetime, i.e., how long the trajectory is kept alive when the object disappears from the camera view and when the object may appear back in the video.

According to an embodiment, detecting the trajectory crossing the one or more virtual sensors comprises gathering at least one of: a timestamp when the virtual sensor was crossed by the at least one object, a class of the at least one object that crossed the virtual sensor, a direction of crossing the virtual sensor, a time spent in virtual sensor zone. In the embodiment, a video feed of a view of an area of interest is received in the computing system. The computing system is configured to separate the received video feed of the view of the area of interest into a predetermined number of frames, e.g., into a first frame, a second frame, and a third frame. Once a moving object has appeared to the view of the area of interest, the computing system is configured to detect the moving object in its first position and by a detection neural network to output a bounding box around the detected moving object. A processor of the computing system is configured to detect the location coordinates of the moving object on the first frame, on the second frame, wherein the moving object is moved to the second position, and on the third frame, wherein the moving object has moved to the third position and calculate the trajectory of the moving object based on the location coordinates of the moving object on each frame. Calculating the trajectory is performed by the system by determining path points of the detected object in each subsequent frame, detecting coordinates of the path points in each subsequent frame, connecting the coordinates of the path point in each subsequent frame. An application programming interface (API) of the computing system is configured to display the received video feed on the user device, track the calculated trajectory, display the calculated trajectory on top of the video feed as a separate layer, detect the trajectory crossing the virtual sensor having a first side A1 and a second side B1 and use the detected trajectory crossing the one or more virtual sensors as the gathered information, wherein the detected trajectory crossing the one or more virtual sensors comprises at least the time moment of crossing the virtual sensor, the moving direction from the first side of the virtual sensor towards the second side of the virtual sensor, a class of the moving object (e.g., a person (pedestrian, shopping mall visitor), a car, a truck, a bike, an animal), and the trajectory coordinates the moving object from the first position to the second position.

According to an embodiment, the method further comprises predicting a moving direction of the detected at least one object based on the calculated trajectory. This enables, for example, to determine the movements of the objects moving in a closed or larger area of interest, such as a shopping mall, and to find out in which areas, when and how many objects (e.g., visitors) intend to stay and how, i.e., by which trajectory the objects are using when moving from one location to another location in the area of interest.

In another aspect, an embodiment of the present disclosure provides a system for gathering information of an object moving in an area of interest, the system comprises a computing system comprising at least one processor and a memory, wherein the computing system is configured to receive a video feed of a view of the area of interest, the at least one processor is configured to separate the received video feed into frames, analyze the received video frame by frame to detect the at least one object in each frame, calculate a trajectory of the each detected object, receive the coordinates of one or more virtual sensors; and the memory is configured to store coordinates of the at least one object moving in an area of interest, coordinates of the one or more locations of the one or more virtual sensors, the detected trajectory crossing the one or more virtual sensors; and an application programming interface (API) configured to execute superimposing of one or more virtual sensors at one or more locations in the view of the area of interest; detect coordinates of the one or more locations of the one or more virtual sensors in the view of the area of interest; track the trajectory of the at least one object from frame to frame for detecting the trajectory crossing the one or more virtual sensors; use the detected trajectory crossing the one or more virtual sensors as the gathered information.

The video stream received in the computing system is separated into frames by the at least one processor, and the processor of the computing system is configured to analyze the video frame by frame to detect objects moving in the area of interest in the frames. The computing system can be, e.g., a server or a computing device to provide computational resources to the system. The computational resources are required to process the video sources as well as run the detection neural networks. According to the embodiments of the present disclosure, the computation system can be implemented as a cloud-hosted solution as well as on-premise self-hosted systems comprising a Kubernetes cluster.

According to the embodiments of the present disclosure, at least one processor is set up for each received video feed. The processor can be, e.g., an artificial intelligence (AI) processor or an AI chip, which in different embodiments may additionally comprise a GPU, a CPU, or a GPU and CPU. Using the GPU enables to save the system computing resources and makes the processing faster. In the prior art, solutions such as object tracking processing are performed by using CPU and GPU, which makes the processing very slow.

To detect the at least one object in each frame, the processor may further comprise an object detection module configured to detect the at least one object moving in an area of interest in the received video feed and classify the detected object by using one or more detection neural networks. The object detection module is configured to detect the objects in the received video feed and classify the detected objects by using open-source frameworks (empty or pre-trained detection neural networks) YOLOv3, Mask R-CNN, FairMOT) that are retrained to increase the number of objects detected as well as increase use-case specific accuracy. Alternatively, the detection can be done by using edge computing.

To calculate the trajectory of each detected object, the processor may further comprise an object tracking module configured to calculate the trajectory of the at least one object and track the at least one object from frame to frame. The object tracking module is configured to map the object movement trajectory by using the bounding boxes of objects and an intersection over the union method from a video frame to a video frame to determine the movement trajectory of the object. This can be configured to look at frame-n frames. Alternatively, the trajectory mapping may be built in a way using neural networks.

According to the embodiments of the present disclosure, the system is configured to detect the moving objects in the video feed and use the trajectory created by bounding boxes or detections by detection neural networks on consecutive frames as the trigger of crossing the virtual sensor. The trajectory for an object is obtained by object tracking. Tracking in contexts of the present embodiments means connecting the same objects in different consecutive frames. This allows understanding how and in which direction a particular object moves during the video stream.

Object trajectory can be created with an online and real-time tracking model, DeepSORT, that includes various steps to connect objects on different frames or with a more simple and faster IoU solution. The DeepSORT is configured to use 4 steps to associate objects between frames, i.e., detection, estimation, association, and track creation. The estimation part is handled by Kalman Afilter framework or Linear velocity model. Association of the target object can be done by IoU and the Hungarian algorithm. This associates the predicted location of an object with its actual location. Additionally, a distance metric called the Appearance feature vector is introduced that takes an appearance descriptor from each detected object. This helps to lower the number of identity switches, meaning the embodiments are able to associate better moving objects to each other in different frames. Track creation is a lifecycle management component for a track, handling the start and the end of a track.

In an example, a system for gathering information of an object moving in an area of interest comprises a computing system comprising at least one processor, a database, a memory comprising one or more machine learning models, and an application programming interface (API). The processor comprises a video pre-processing module, an object identification module, an object tracking module, a visual sensor module. The computing system is configured to receive over the telecommunication network a video feed from the video resource and is connected over the telecommunication network and via the API to the user device.

The processor may further comprise a virtual sensor mapping module for enabling the user to virtual sensor zones on the video feed to trigger events. The virtual sensor mapping module is for mapping the virtual sensor in respect of the at least one moving object.

In an embodiment, the AI processor is configured to separate the video stream received in the server into frames; analyze the received video frame by frame to detect the objects in the frame; determine moving trajectory of each detected object by using GPU of the processor; detect the coordinates of the trajectory; receive the coordinates of the virtual sensors defined via the user interface by the user. Using the GPU enables to save the system computing resources and makes the processing faster. In the prior art solutions, such as object tracking, the processing is performed by using CPU, which makes the processing very slow.

In an embodiment, the API is configured to receive the video feed tunneled from the user device or video source to the server, receive and store the coordinates of (e.g., the starting point and endpoint of the line forming) the virtual sensor added by the user in the user interface or generated by the system automatically, compare the coordinates of the trajectory of the moving object and the coordinates of the location of the virtual sensor and detect the crossing of the path point. The API may optionally be further configured to optimize the video resolution by using detection neural networks. The preferred resolution of the video is 480×640, which is most optimal for the detection neural networks processing the video.

In an embodiment, the system may optionally comprise a video feed pre-processing module for re-encoding the video feed into a format that is acceptable input for the detection neural networks. The video feed pre-processing module enables additional down sampling videos to increase privacy by using GPU processing of YUV to RGB.

According to an embodiment, the system further comprises one or more modules selected from a video feed processing module configured to process the video feed suitable for the detection neural networks, an automatic resource provisioning module configured to optimize hardware resources, an error handling and monitoring module configured to secure availability of the video feed, a video source quality inspection module configured to optimize quality of the video feed, an automatic video anonymization module configured to remove identifiable information from the video feed.

The video feed processing module may be configured at least to optimize a video resolution, a frame rate, or to reduce the video size depending on the video stream received in the system. In the embodiments, wherein the video resolution is optimized, the preferred resolution of the video may be, e.g., 640×480, 1280×720, 1920×1080, 2048×1152, 3840×2160, 4096×2160, depending on which is most optimal for the detection neural networks processing the video. In the embodiments, wherein the frame rate is optimized, the frame rate may be changed to 5 FPS-15 FPS. The frame rate frames per second (FPS) that the video is looked at can be from 5, 6, 7, 8, 9, 10, 11, 12, 13, 14 FPS to 6, 7, 8, 9, 10, 11, 12, 13, 14, 15 FPS. Preferably 9-10 FPS. This has an effect on the algorithms' ability to track objects as a lower FPS may not be suitable in tracking a vehicle. I.e., if the frame rate is less than 5FPS, the algorithm may not be able to detect the object in the frames and thus not be able to calculate the trajectory.

In an embodiment, the system may optionally comprise an automatic resource provisioning module to automatically add hardware resources (CPU and GPU power) to newly received video streams. If a user adds a new video stream to the system, a Docker image is provisioned within the hosting service to provide it the necessary resources required.

In an embodiment, the system may optionally comprise a video source error handling and monitoring module, which is configured to ensure that the video stream is usable constantly. If a connection breaks, then an attempt is made to restart the feed. If that fails, several attempts are made to restore the feed. If that fails again, in the user interface an error is reported to the user.

In an embodiment, the system may optionally comprise a video source quality inspection module, which is configured to determine the video characteristics such as blurriness and water droplets to see at what quality the video stream is at. Quality inspection may be built as a script that looks at the sharpness of edges on the image (e.g., Laplacian variance).

In an embodiment, the system may optionally comprise an automatic video anonymization module, which is configured to remove all identifiable information automatically from the video stream using blurring (e.g., faces, vehicle number plates, and other sensitive information) and the destruction of unnecessary video data. Optionally the video stream may be processed by the automatic video anonymization module to anonymize, e.g., people's faces, vehicle number plates. Optionally, the system may comprise an automatic video anonymization module located in the server or in an external computing device.

According to an embodiment, the system further comprises a user interface accessible via one or more user devices, wherein the user interface is configured to define the virtual sensors, to tunnel the video feed from video source to the computing system, to provide the video feed with a name of the video feed and a video stream URL including a username, a password, an IP address and a port of the video feed, provide means for selection of one or more machine learning models to be used to detect objects in the video feed, provide means for selection of the frame rate and provide means for predefining a number of subsequent frames to track the object. The user interface (UI) the system to receive the video stream in the embodiments, wherein the videos stream is not transferred from the video source directly to the system and allows the user to choose the video stream, either live video feed or historical video, to be processed and define for the system the set of video processing input parameters to initiate the system to receive the video stream. When the user is providing the set of video processing input parameters to the UI, the UI enables the application programming interface to transfer the defined set of video processing parameters to the computing system. The selection of one or more machine learning models to be used to detect objects in the video feed affects the number of object classes to be detected, i.e., cars, busses, trucks, pedestrians.

In an example embodiment, the user device is connected over the telecommunication network with the computing system and the video resource and is provided by the computing system with a user interface displaying a received video feed of outdoor area of interest, wherein in the view of the area of interest are moving different objects, e.g., a group of people in a bus stop and people, visiting buildings, vehicles in the street and vehicles in a parking lot. The computing system is configured to receive a set of video processing input parameters such as the name of the video feed, URL of video feed, preset (e.g., outdoor), frame rate (FPS), mask, minimum consecutive frames for tracked objects. The user interface is further provided with a selection of different types of virtual sensors for executing the superimposing of the virtual sensors on top of the video feed. For gathering information about the people moving in the bus stop, the computing system is configured to receive via the user interface the location coordinates of a ring-shaped virtual sensor. For gathering information about the people visiting the buildings, the system is configured to receive via the user interface the location coordinates of square-shaped virtual sensors. For gathering information about the vehicles moving in the street, the system is configured to receive via the user interface the location coordinates of a line-shaped virtual sensor. For gathering information about the vehicles moving in the parking lot, the system is configured to receive via the user interface the location coordinates of line-shaped virtual sensors and a free-form polygon-shaped virtual sensor.

According to an embodiment, the processor is further configured to run one or more machine learning models stored in the memory. The one or more machine learning models (e.g., YOLO model, trained detection neural network) is configured to use annotated images to train and find the most suitable weights and parameters for the model for specific video streams. This means that the one or more machine learning models are configured to understand the importance of different features for the processed video stream. The features are specific shapes, lines, patterns on an image that all together in a bundle represent a specific type of object like a car, bike in the processed video stream. The one or more machine learning models eventually learn that the shapes and patterns together mean that the moving object is a car or something else.

According to an embodiment, the virtual sensor comprises a first side and a second side opposite to one another, and the virtual sensor is selected from a group comprising a line segment virtual sensor, an arc virtual sensor, an ellipse virtual sensor, a ring virtual sensor, a polygon virtual sensor, a semicircle virtual sensor, a convex line virtual sensor or a curved irregular virtual sensor. Optionally, the virtual sensor comprises a first side A and a second side B, which enables to determine a moving direction of the object if the object crosses the virtual sensor from the first side A towards the second side B and only detect those objects that are moving in that direction without being interfered by those object that are moving in the opposite direction.

The virtual sensors defined as straight, curved, or convex lines enable e.g., to track the moving of objects in the locations having revolving doors (e.g., shopping centers, hotels, airports). The virtual sensors defined as polygons enable, e.g., to define monitored areas and detect how many objects are in the area. The virtual sensors are defined as a ring, ellipse, polygon (i.e., triangular, rectangular, pentagonal, hexagonal), semicircle enable to count objects in a certain area, which encircled by such virtual sensor, i.e., the objects which are within such virtual sensor.

Furthermore, the virtual sensors can be used as street traffic sensors and enable to count of moving objects on the street. For example, in intersection or street analytics, the virtual sensors enable to replace a plurality of the physical radar-based sensors and thus significantly reduce the costs because only one or two cameras that look at the intersection may need to cover the whole area of interest, and the virtual sensors can be defined in the exact same locations on top of the video feed as the physical sensors would have been set up. As the typical radar-based sensors only provide the count and minimal classification of vehicles, the virtual sensors, according to the present disclosure, enable to gather a lot more information about objects moving in the intersection or on the street.

The virtual sensors can also be used as retail sensors, which enable to count people entering a shop, a restaurant, a gas station, an office, or any building. In retail analytics, the virtual sensors enable to understand where people walk inside the shopping center and which shops they visit. For example, in retail store analytics, the embodiments according to the present disclosure can be implemented in a retail store and large shopping centers to track occupancy, i.e., how many people are in the store, event, or environment, and to analyze the effectiveness of specific zones in the store.

The virtual sensors also enable to count people using different machines, such as ATMs, vending machines, self-service kiosks. The virtual sensors also enable indoor or outdoor physical advertisement analytics, i.e., using a camera that can see the advertisement and understand how many people walk by the advertisement. The virtual sensors also enable urban street analytics to understand the usage of specific outdoor areas.

The virtual sensors can also be used for safety analysis by defining dangerous areas within the camera view angle and seeing how many objects go in these areas. E.g., The virtual sensor can be surprisingly effective also for surveillance and security cameras, especially for small businesses and home users, wherein the camera owner can avoid false alarms by using the virtual sensor for detecting movements only in a certain area of the whole camera view. E.g., if in the camera view there are a door, a gate, and other areas where neighbors or other people may walk, this may cause false alarms as the security camera detects a movement every time when somebody is passing the camera. Thus, using the virtual sensor enables to limit the area to detect possible intruders, e.g., only the door front.

In another aspect, an embodiment of the present disclosure provides a computer program for gathering information of an object moving in an area of interest comprising computer readable instructions adapted to perform the method according to the embodiments of the present disclosure, when the computer program is executed by the computing system. The computer program enables a possessor of the computing system to implement the method according to the embodiments of the present disclosure.

In an embodiment, the system, method, and computer program according to the present disclosure are implemented as a platform comprising an analytics dashboard and a backend dashboard. The analytics dashboard enables via UI to display the user the camera feeds being monitored and analytics results from those feeds over a period of time. The backend dashboard also allows the user to set up a camera feed themselves and post-process pre-captured video files using custom algorithms made available via the system that the user can pick and choose between.

DETAILED DESCRIPTION OF THE DRAWINGS

Referring to FIG. 1, there is shown a block diagram of a method for gathering information of an object moving in an area of interest according to an embodiment of the present disclosure. At a step 101, the method comprises receiving in a processor 112 of a computing system 110 a video feed of a view of the area of interest from a video source 116, wherein the video feed of the view of the area of interest comprises at least one object moving in the area of interest and receiving from a user device 118 comprising a user interface via the application programming interface 114 a set of video processing input parameters. At a step 102, the method comprises separating the received video feed of the view of the area of interest into frames. At a step 103, the method comprises detecting the at least one object moving in an area of interest in a predefined number of subsequent frames. At a step 104, the method comprises calculating a trajectory of the at least one detected object. At a step 105, the method comprises executing superimposing of one or more virtual sensors at one or more locations in the view of the area of interest by the application programming interface 114. At a step 106, the method comprises detecting coordinates of the one or more locations of the one or more virtual sensors in the view of the area of interest. At a step 107, the method comprises tracking the trajectory of the at least one object from frame to frame for detecting the trajectory crossing the virtual sensor. At a step 108, the method comprises using the detected trajectory crossing the one or more virtual sensors as the gathered information.

Figure 2:
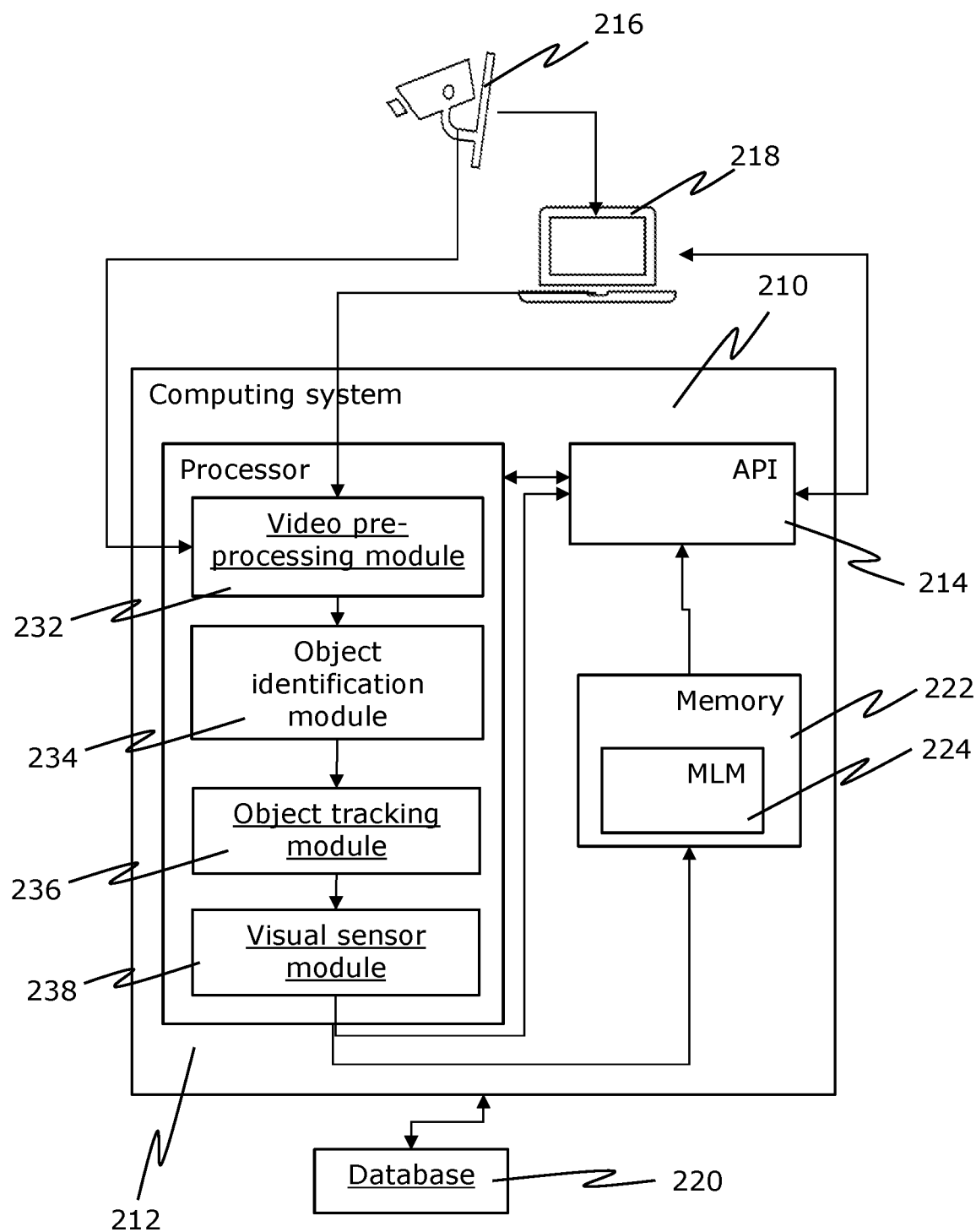
FIG. 2 is a schematic illustration of a system for gathering information of an object moving in an area of interest according to an embodiment of the present disclosure.

Referring to FIG. 2, there is shown a schematic illustration of an exemplary embodiment of a system for gathering information of an object moving in an area of interest according to the present disclosure. In the embodiment, the system comprises a computing system 210 comprising at least one processor 212, a database 220, a memory 222 comprising one or more machine learning models 224, and an application programming interface (API) 214. The processor comprises a video pre-processing module 232, an object identification module 234, an object tracking module 236, a visual sensor module 238. The computing system is configured to receive over the telecommunication network a video feed from the video resource 216 and is connected over the telecommunication network and via the API to the user device 218.

Figure 3A:
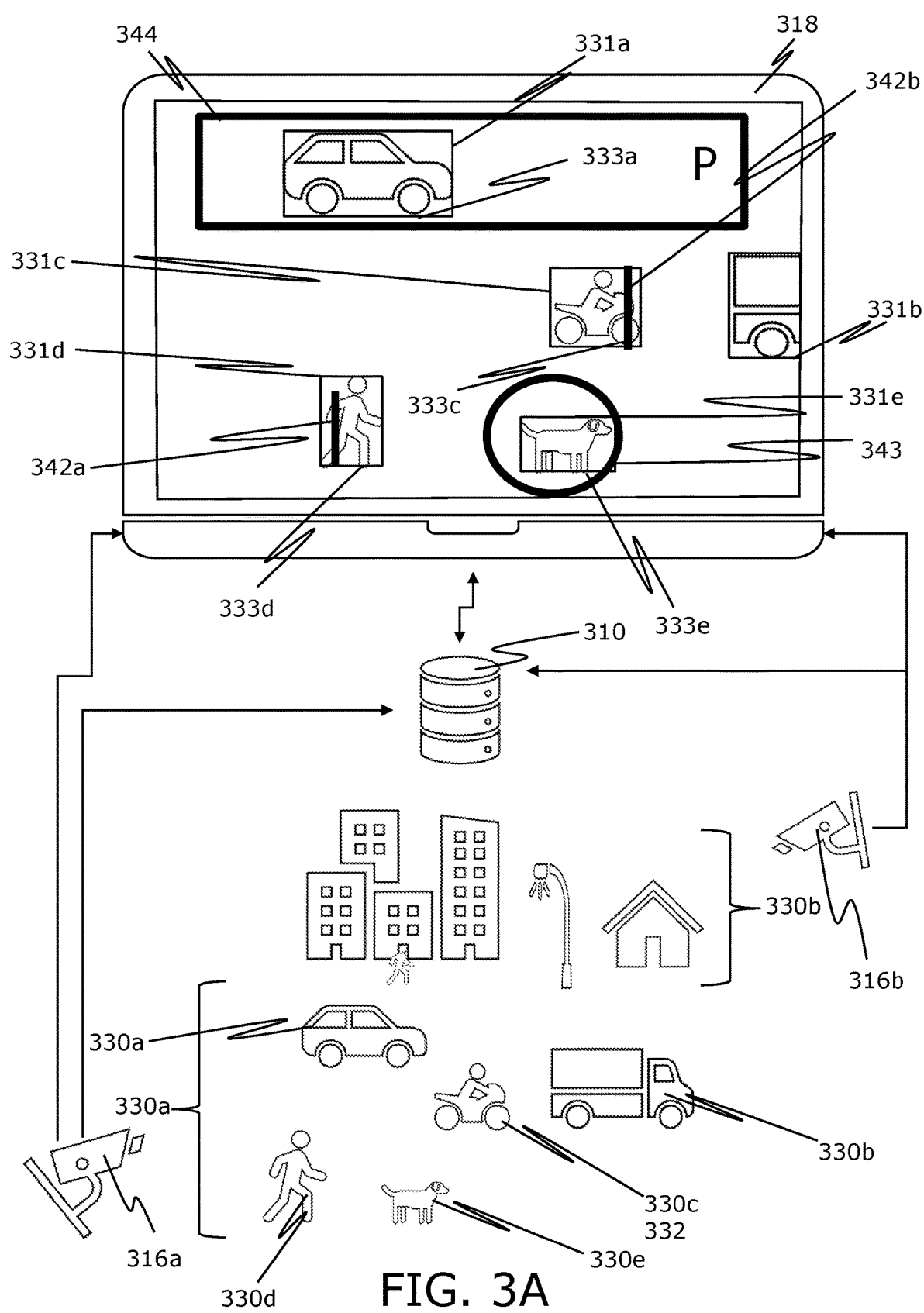
FIG. 3A is a schematic illustration of an implementation of virtual sensors according to an embodiment of the present disclosure.
Figure 3B:
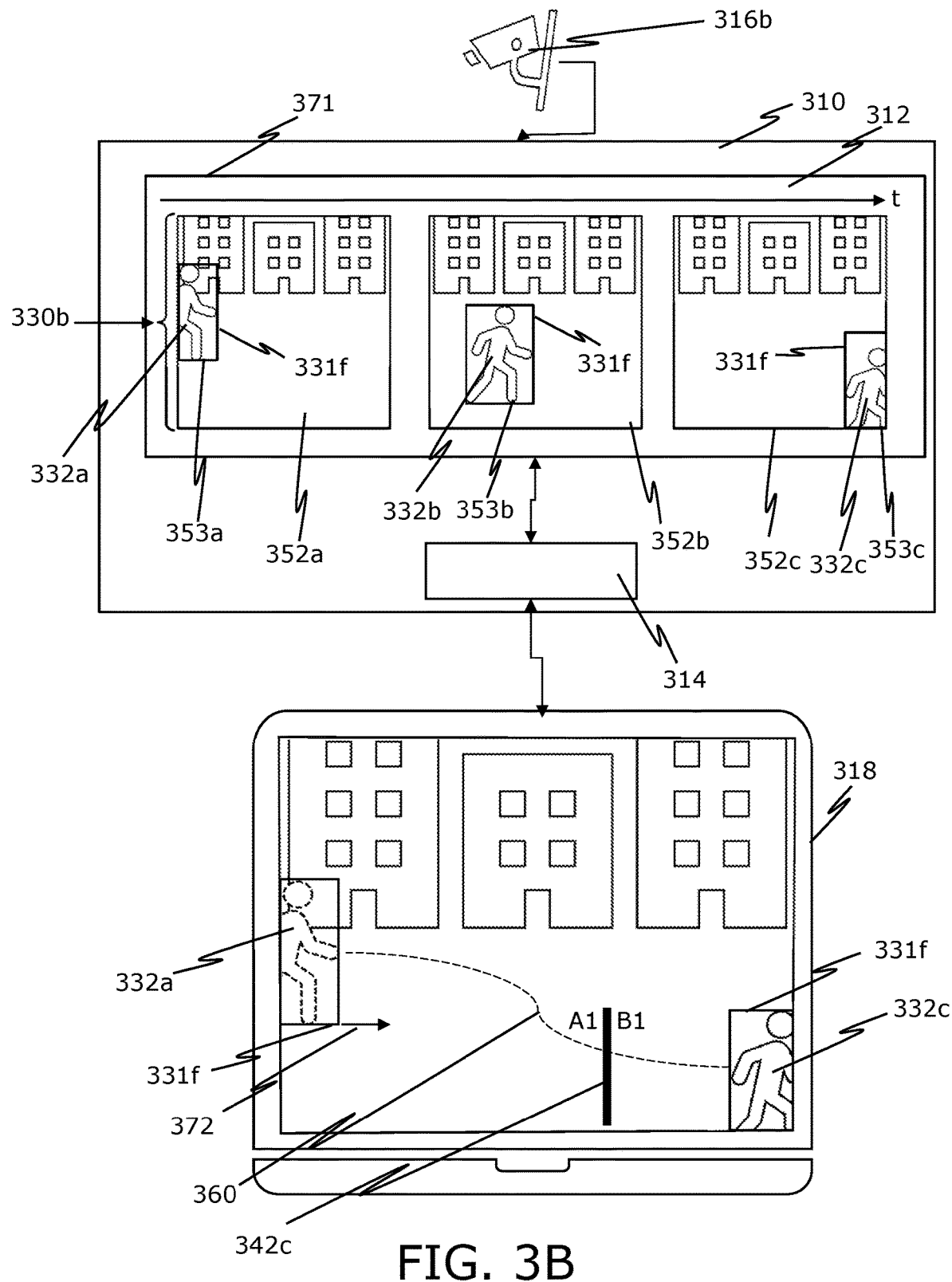
FIG. 3B is a schematic illustration of tracking a trajectory of an object moving in an area of interest from frame to frame, according to an embodiment of the present disclosure.

Referring to FIG. 3A, there is illustrated an implementation of virtual sensors according to an embodiment of the present disclosure. The area of interest is recorded by a first camera 316a and by a second camera 316b, the computing system 310 is configured to receive a first video feed of a view of the area of interest 330a from the first camera 316a and a second video feed of a view of the area of interest 330b from the second camera 316b. The first video feed of a view of the area of interest displayed on a user device 318 and received in the computing system 310 comprises objects moving in the area of interest, e.g., a car 330a, a truck 330b, a bike 330c, a pedestrian 330d, and a dog 330e. By executing superimposing the one or more virtual sensors at one or more locations in the view of the area of interest the user has drawn via the user interface on top of the first video feed a first line shape virtual sensor 342a, a second line shape virtual sensor 342b, a ring shape virtual sensor 343, and a rectangular virtual sensor 344. The shapes and the location coordinates of the user-initiated superimposed virtual sensors are received in the computing system. Once the moving objects have appeared to the view of the area of interest, the computing system 310 is configured to detect the moving objects and by a detection neural network to output bounding boxes 331a, 331b, 331c, 331d, 331e around the detected moving objects. By the first line shape virtual sensor 342a, the computing system 310 gathers information that on the sidewalk there is walking pedestrian 330d. By the line shape virtual sensor 342b, the computing system 310 gathers information that on the street there are moving one truck 330b and one bike 330c. By the rectangular virtual sensor 344, the computing system 310 gathers information that into a parking area P there is entered one car 330a. The moving object crossing the virtual sensors 342a, 342b, 343, 344 is detected by the system by determining a path point 333a, 333b, 333c, 333e of each bounding box 331a, 331b, 331c, 331d, 331e crossing the corresponding virtual sensors Referring to FIG. 3B, there is illustrated tracking a trajectory of an object moving in an area of interest from frame to frame, according to an embodiment of the present disclosure. A video feed of a view of an area of interest 330b is received in the computing system 310, the computing system 310 is configured to separate the received video feed of the view of the area of interest into a predetermined number of frames, e.g., into a first frame 352a, a second frame 352b and a third frame 352c. Once a moving object has appeared to the view of the area of interest, the computing system 310 is configured to detect the moving object in its first position 332a and by a detection neural network to output a bounding box 331f around the detected moving object, wherein the detected moving object is a pedestrian. A processor 312 of the computing system 310 is configured to detect the location coordinates of the pedestrian on the first frame 352a, on the second frame 352b, wherein the pedestrian is moved to the second position 332b and on third frame 352, wherein the pedestrian is moved to the third position and calculate the trajectory 360 of the pedestrian based on the location coordinates of the moving pedestrian on each frame. Calculating the trajectory 360 is performed by the system by determining path points 353a, 353b, 353c of the detected object in each subsequent frame 352a, 352b, 352c, detecting coordinates of the path points in each subsequent frame, connecting the coordinates of the path point in each subsequent frame. An application programming interface (API) 314 of the computing system 310 is configured to display the received video feed on the user device 318, track the calculated trajectory 360, display the calculated trajectory 360 on top of the video feed as a separate layer, detect the trajectory 360 crossing the virtual sensor 342c having a first side A1 and a second side B1 and use the detected trajectory crossing the one or more virtual sensors as the gathered information, wherein the detected trajectory crossing the one or more virtual sensors comprises at least the time moment 371 of crossing the virtual sensor, the moving direction 372 from the first side A1 of the virtual sensor towards the second side B1 of the virtual sensor, a class of the moving object, i.e., pedestrian, and the trajectory coordinates the moving pedestrian from the first position 332*a* to the second position 332*c*.

Figure 4A:
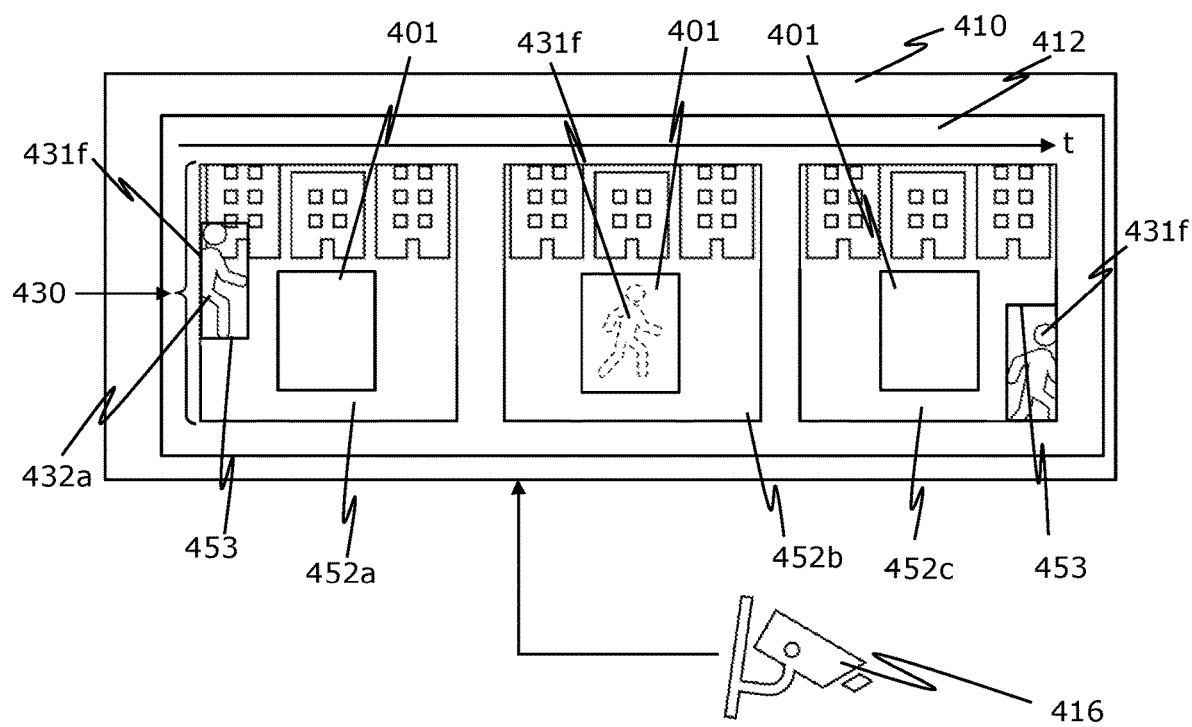
FIG. 4A illustrates an embodiment according to the present disclosure of a moving object if the moving object is hidden behind the non-moving object.
Figure 4B:
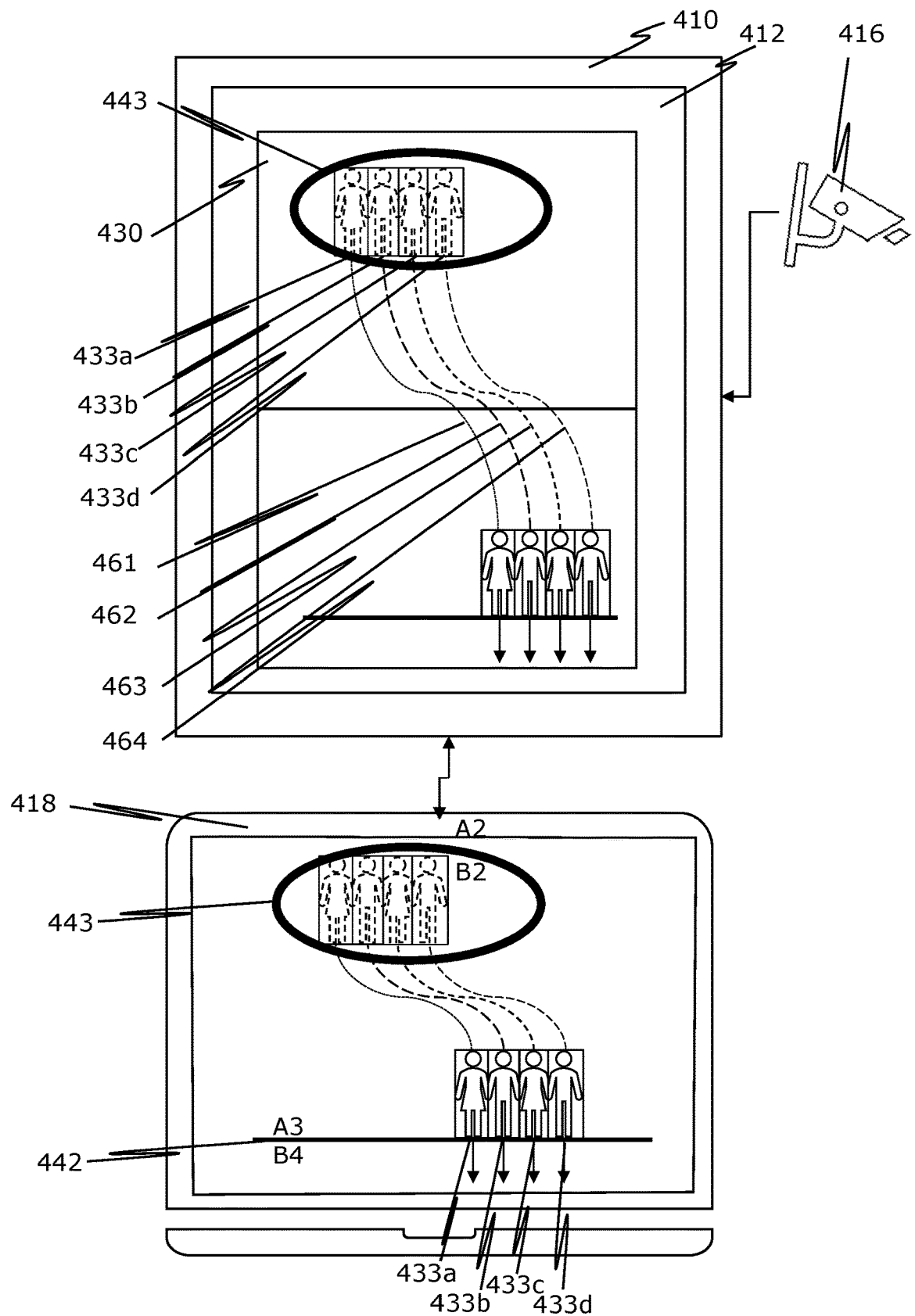
FIG. 4B illustrates an embodiment, wherein multiple objects moving in a group in an area of interest, according to the present disclosure.
Figure 4C:
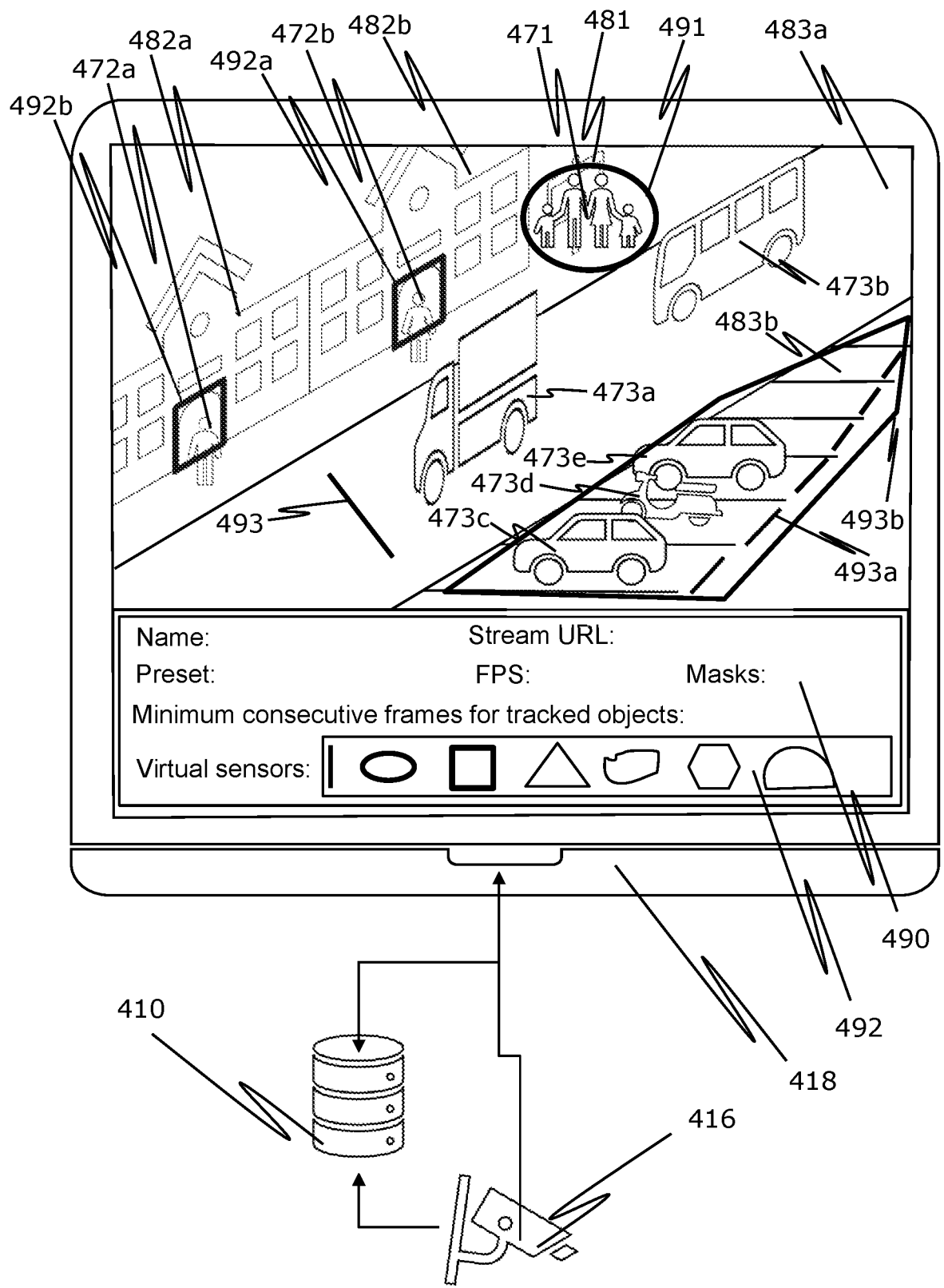
FIG. 4C illustrates a user interface according to an embodiment of the present disclosure.

Figures FIG. 4A-FIG. 4C illustrate different embodiments of virtual sensor implementations according to the present disclosure. Referring to FIG. 4A, there is shown, according to the embodiments of the present disclosure, an implementation of a moving object if the moving object is hidden behind the non-moving object. A video feed of a view of an area of interest 430 is received from a video resource 416 in the computing system 410, the computing system 410 is configured to separate the received video feed of the view of the area of interest into a predetermined number of frames, e.g., into a first frame 452*a*, a second frame 452*b* and a third frame 452*c*, wherein the view of the area of interest and correspondingly each frame comprises a non-moving object 401. Once a moving object 431*f* has detected in the view of the area of interest, the computing system 410 is further configured to detect the moving object in its first location 432*a* and by a detection neural network to output a bounding box 453*a* around the detected moving object, wherein the detected moving object is a pedestrian. On the second frame 452*b*, when the system is detected that the object, i.e., pedestrian has moved behind the non-moving object 401, the computing system is configured, based on the assumption of how long the moving object may be behind the non-moving object, store the last frame of the moving object for a predetermined time and when the object has visible again in the third frame 452*c* calculate the trajectory of the moving object.

Referring to FIG. 4B, there is shown, according to the embodiments of the present disclosure, an implementation of calculating a trajectory of multiple objects moving in a group in an area of interest. A video feed of a view of an area of interest 430 is received from the video resource 416 in the computing system 410, wherein the video feed of the view of an area of interest comprises four people walking in a group. The computing system 410 is configured to separate the received video feed of the view of the area of interest into a first frame 462*a* and a second frame 462*b*. When executing the superimposing virtual sensors, the user input of a first virtual sensor drawn in an ellipse shape 443 having a first side A2 and a second side B2 in a first location and a second virtual sensor has drawn in a line shape 442 having a first side A3 and a second side B3 in a second location is received from the user device 418 in the computing system 410. By executing a detection neural network by a processor 412 of the computing device, the detection neural network outputs bounding boxes around each person in a group, detects the class of moving objects and determines a path points of each person in a group, i.e., a first path point 433*a*, a second path point 433*b*, a third path point 433*c*, and a fourth path point 433*e*. In a first instance, the computing system 410 determines via the first virtual sensor 443 the group of people entering the first location and the time the group of people spends in the first location in the area of interest. Frame by frame, the processor analyses the received video feed, when the group of people is moving to the second location, the computing system detects via the second, line-shaped virtual sensor 442 the time moment when the group of people grosses the virtual sensor in the second location and calculates the trajectories 461, 462, 463, 464 of each person in the group.

Referring to FIG. 4C there is shown a user interface according to an embodiment of the present disclosure. The user device 418 is connected over the telecommunication network with the computing system 410 and the video resource 416 and is provided by the computing system 410 with a user interface displaying a received video feed of outdoor area of interest, wherein in the view of the area of interest are moving different objects, e.g., a group of people 471 in a bus stop 481 and people 472*a*, 472*b* visiting buildings 482*a*, 482*b*, vehicles 473*a*, 473*b* in the street 483*a* and vehicles 473*c*, 473*d*, 473*e* in a parking lot 483*b*. The computing system is configured to receive a set of video processing input parameters 490 such as a name of the video feed, URL of video feed, preset (e.g., outdoor), frame rate (FPS), mask, minimum consecutive frames for tracked objects. The user interface is further provided with a selection of different types of virtual sensors 492 for executing the superimposing of the virtual sensors on top of the video feed. For gathering information about the people moving in the bus stop, the computing system is configured to receive via the user interface the location coordinates of a ring-shaped virtual sensor 491. For gathering information about the people visiting the buildings, the system is configured to receive via the user interface the location coordinates of square-shaped virtual sensors 492*a*, 492*b*. For gathering information about the vehicles moving in the street, the system is configured to receive via the user interface the location coordinates of a line-shaped virtual sensor 493. For gathering information about the vehicles moving in the parking lot, the system is configured to receive via the user interface the location coordinates of line-shaped virtual sensors 493*a* and a free-form polygon-shaped virtual sensor 493*b*.

The invention claimed is:

1. A computer implemented method for gathering information of an object moving in an area of interest, the method comprises:

receiving in a processor of a computing system a video feed of a view of the area of interest, wherein the video feed of the view of the area of interest comprises at least one object moving in the area of interest;

separating the received video feed of the view of the area of interest in which the at least one object is moving into frames;

detecting the at least one object moving in an area of interest in a predefined number of subsequent frames;

calculating a trajectory of the at least one detected object;

superimposing one or more virtual sensors at one or more locations in the view of the area of interest; detecting coordinates of the one or more locations of the one or more virtual sensors in the view of the area of interest;

specifying a computer vision learning model to be used by the one or more virtual sensors to detect the at least one object;

tracking the trajectory of the at least one object from frame to frame by detecting the trajectory crossing the one or more virtual sensors;

using the detected trajectory crossing the one or more virtual sensors as the gathered information; and storing, for a pre-determined time, a last frame including the at least one object at a last time the at least one object was visible in the view of the area of interest;

wherein the computing system further comprises a user interface accessible via one or more user devices, and wherein the method comprises utilizing the user interface to:
define the virtual sensors;
tunnel the video feed from a video source to the computing system,
provide the video feed with a name of the video feed and a video stream URL including a username, a password, an IP address and a port of the video feed;
provide means for selection of one or more machine learning models to be used to detect objects in the video feed;
provide means for selection of the frame rate; and
provide means for predefining a number of subsequent frames to track the object.

2. The method according to claim 1, wherein separating the received video feed into frames comprises changing a frame rate to 5 FPS-15 FPS.

3. The method according to claim 1, wherein detecting the at least one object moving in the view of the area of interest is performed by using one or more machine learning models trained to analyze one or more features of the detected at least one object and whether the at least one object is still visible in the predefined number of subsequent frames.

4. The method according to claim 1, wherein detecting the at least one object moving in the view of the area of interest is performed by a detection neural network configured to output bounding boxes around the at least one detected object in each frame of the predefined number of subsequent frames.

5. The method according to claim 1, wherein calculating the trajectory comprises:
determining a path point of the at least one detected object in each subsequent frame;
detecting coordinates of the path point in each subsequent frame;
connecting the coordinates of the path point in each subsequent frame.

6. The method according to claim 1, wherein executing the superimposing comprises providing a user interface via an application programming interface (API) of the computing system to the user device to receive a user input for generating the one or more virtual sensors.

7. The method according to claim 1, wherein detecting the trajectory crossing the virtual sensor comprises comparing the coordinates of the trajectory of the at least one object moving in the view of the area of interest and the coordinates of the one or more locations of the one or more virtual sensors.

8. The method according to claim 1, wherein the detected trajectory crossing the one or more virtual sensors comprises gathering at least one of: a timestamp when the virtual sensor was crossed by the at least one object, a class of the at least one object that crossed the virtual sensor, a direction of crossing the virtual sensor, a time spent in virtual sensor zone.

9. The method according to claim 1, wherein the method further comprises predicting a moving direction of the detected at least one object based on the calculated trajectory.

10. A system for gathering information of an object moving in an area of interest, the system comprises:
a computing system comprising at least one processor and a memory, wherein
the computing system is configured to receive a video feed of a view of the area of interest,
the at least one processor is configured to:
separate the received video feed in which the object is moving into frames,
analyze the received video frame by frame to detect the at least one object in each frame,
calculate a trajectory of the each detected object,
receive the coordinates of one or more virtual sensors; and
the memory is configured to store coordinates of the at least one object moving in an area of interest, coordinates of the one or more locations of the one or more virtual sensors, the detected trajectory crossing the one or more virtual sensors; and
an application programming interface configured to:
execute superimposing of one or more virtual sensors at one or more locations in the view of the area of interest;
detect coordinates of the one or more locations of the one or more virtual sensors in the view of the area of interest;
specify a computer vision learning model to be used by the one or more virtual sensors to detect the at least one object;
track the trajectory of the at least one object from frame to frame for detecting the trajectory crossing the one or more virtual sensor;
use the detected trajectory crossing the one or more virtual sensors as the gathered information; and
store, for a pre-determined time, a last frame including the at least one object at a last time the at least one object was visible in the view of the area of interest,
wherein the system further comprises a user interface accessible via one or more user devices, wherein the user interface is configured to define the virtual sensors, to tunnel the video feed from video source to the computing system, to provide the video feed with a name of the video feed and a video stream URL including a username, a password, an IP address and a port of the video feed, provide means for selection of one or more machine learning models to be used to detect objects in the video feed, provide means for selection of the frame rate and provide means for predefining a number of subsequent frames to track the object.

11. The system according to claim 10, wherein the system further comprises one or more modules selected from:
a video feed processing module configured to process the video feed suitable for the detection neural networks,
an automatic resource provisioning module configured to optimize hardware resources,
an error handling and monitoring module configured to secure availability of the video feed,
a video source quality inspection module configured to optimize a quality of the video feed,
an automatic video anonymization module configured to remove identifiable information from the video feed.

12. The system according to claim 10, wherein the processor is further configured to run one or more machine learning models stored in the memory.

13. The system according to claim 10, wherein the virtual sensor comprises a first side and a second side opposite to one another and the virtual sensor is selected from a group comprising a line segment virtual sensor, an arc virtual sensor, an ellipse virtual sensor, a ring virtual sensor, a polygon virtual sensor, a semicircle virtual sensor, a convex line virtual sensor or a curved irregular virtual sensor.

14. A non-transitory computer readable medium on which is recorded a computer program for gathering information of an object moving in an area of interest and adapted to perform the method according to claim 1, when the computer program is executed by the computing system.

* * * * *